INVENTOR.
William S. White
BY
ATTORNEY

Jan. 5, 1954   W. S. WHITE   2,664,912
AUTOMATIC HYDRAULIC VALVE
Filed May 20, 1949   3 Sheets-Sheet 2

*INVENTOR.*
William S. White
BY
ATTORNEY

Jan. 5, 1954 — W. S. WHITE — 2,664,912
AUTOMATIC HYDRAULIC VALVE
Filed May 20, 1949 — 3 Sheets-Sheet 3

*INVENTOR.*
William S. White
BY
*W. A. McGrew*
ATTORNEY

Patented Jan. 5, 1954

2,664,912

UNITED STATES PATENT OFFICE 2,664,912

AUTOMATIC HYDRAULIC VALVE

William S. White, Denver, Colo.

Application May 20, 1949, Serial No. 94,396

5 Claims. (Cl. 137—211)

My invention is directed to valves, and is a continuation in part of my application Serial No. 481,666, now Patent No. 2,470,798, issued May 24, 1949. More particularly, my invention relates to valves of the type adapted to continuously fill and intermittently discharge accumulators and the like, such as tanks disposed to trap air above the liquid contained therein.

My valve is particularly useful in controlling flushing operations of various nature, or in instances where water supply systems and the like are inadequate to satisfactorily supply special demands, such as may occur, for example, when a lawn sprinkling system installed in a residence is placed in operation. The heavy demand for water placed on the system ordinarily results in an excessive pressure drop, which prevents satisfactory operation of other subsidiary systems which may require water under pressure at the time. By the installation of my valve between an ordinary source of liquid supply under pressure and a tank or accumulator which discharges into the sprinkler or similar system, I can avoid these excessive pressure drops, and allow operation of high-demand secondary systems on an intermittent basis without materially affecting the supply pressure or satisfactory operation of the principal system.

A primary object of my invention is to provide a valve for continuously charging an accumulator from a liquid pressure system without markedly affecting the pressure in the supply system, and for periodically discharging the accumulator into a secondary system without undue noise, chatter, or surge, and at a predetermined pressure.

Other objects include the provision of a valve of the type described, which includes reliable means for injecting or aspirating air into the accumulator, which is highly reliable and durable, easily serviced, and which will gradually, but positively, close the accumulator outlet as the pressure conditions fluctuate between limits.

In brief, my valve receives liquid under pressure in a cylinder containing a piston, and delivers this liquid through a relatively small Venturi type tube to the accumulator to which the valve is attached, the necessary air for the operation of the accumulator being drawn into the liquid through an aspirating passageway communicating with the Venturi tube. The inlet pressure acts against the piston in the cylinder, forcing the piston downwardly and thereby closing the main or outlet valve to which the piston is connected by a lost motion linkage. Liquid under pressure from the accumulator is bled slowly into the space below the piston, thus forcing the latter upwardly against the inlet pressure until a small second valve is opened permitting full inlet pressure to drive the piston up with considerable force. This final movement of the piston in an upward direction opens the main outlet valve slightly, thus lowering the effective pressure against the valve and allowing a small piston on the valve stem to drive the stem and main valve into fully open position under the influence of inlet pressure.

As the main outlet valve opens fully, the small valve is closed, thus preventing the communication of inlet pressure to the underside of the piston. A check valve, usually mounted in the piston, permits liquid trapped below the piston to bleed slowly into the accumulator as the pressure therein falls below inlet pressure. Since the rate at which this liquid is allowed to pass the check valve is relatively slow, considerable time elapses before the piston is permitted to move downwardly a distance sufficient to pull the main valve downwardly into closed position. Closing the main valve recycles the entire valve and permits periodic operation of the device without further adjustment.

The direction of each cycle is controlled principally by the cross sectional area of the Venturi tube, which is the sole means of communication between the supply system and the accumulator. Thus, an increase in the cross sectional area of the venturi will reduce the period required for the complete cycling of the valve, while the use of a very small tube will extend the period.

The several further objects and advantages of my invention will be disclosed in the course of the following detailed description and in the appended drawings, in which.

Figs. 4—7, inclusive are diagrammatic representations of the position of various portions of my valve at intervals in its cycle.

Figure 1:
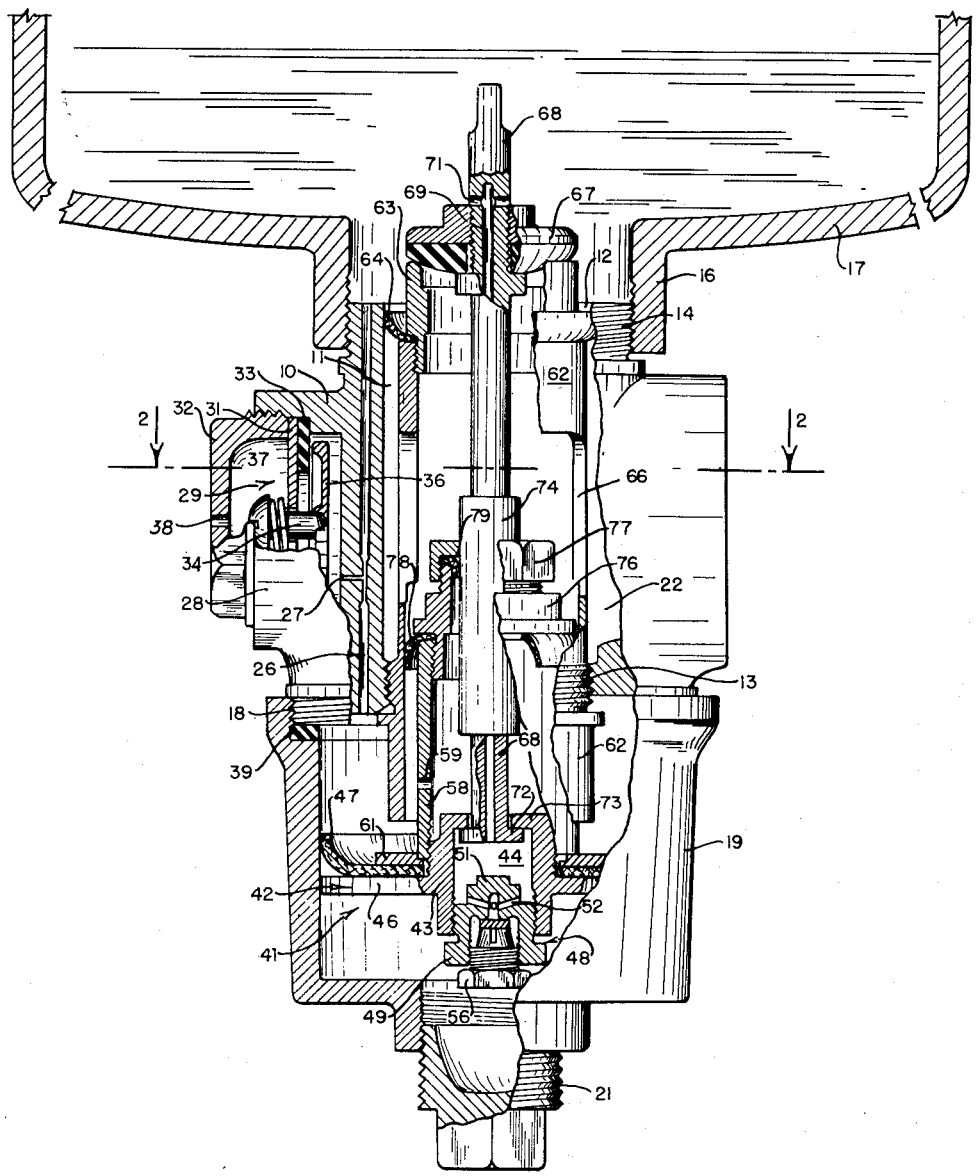
Fig. 1 is a partially sectioned elevation of a preferred embodiment of my valve.
Figure 2:
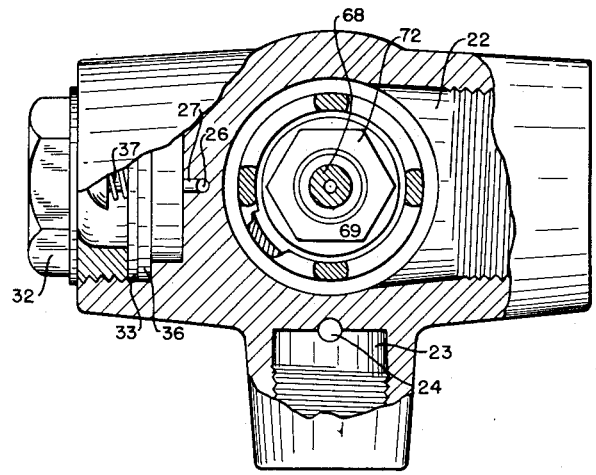
Fig. 2 is a partial cross section taken along the lines 2—2 of Fig. 1.

My invention is best illustrated by an embodiment of my valve shown in Fig. 1 wherein I have illustrated the body 10 having a central bore 11 terminating in an open upper end, indicated at 12, and provided with internal threads 13 near its lower end. The upper end of the body is threaded, as indicated at 14, for engagement with a threaded flange 16 disposed in the bottom of a tank or accumulator 17. The lower end of the body 10 is also threaded, as at 18, for engagement with a cylinder 19, the lower end of which is closed by a drain plug 21. The central bore 11 communicates with an outlet opening 22. An inlet 23 is also formed in the body 10 at approximately ninety degrees to the axis of the outlet 22 and terminates in a small vertically extending passageway 24, which serves to conduct liquid under pressure from the inlet 23 downwardly into the upper portion of the cylinder 19 (Fig. 2).

Within a wall of the body 10 is a Venturi tube 26 extending generally parallel to the central bore 11, and serving to connect the upper portion of the cylinder 19 with a space within the accumulator 17. Extending laterally from the Venturi tube 26 at or near the throat of the Venturi section is an aspirating passageway 27, which interconnects the Venturi passageway 26 and the interior of a cylindrical flange 28 projecting outwardly from the body 10.

Within the flange 28 I provide an air check valve, generally designated 29, adapted to permit the passage of air inwardly through the aspirating passageway 27, but to prevent the passage of air or liquid in the opposite direction. The air valve 29 may, for example, include a rigid washer 31 secured to a body 32 threaded in the flange 28. The washer 31 supports a valve seat 33 of rubber or the like on its inner face and is also provided with a central aperture through which a valve stem 34 extends. The inner end of the valve stem 34 supports a valve 36 which is urged by a spring 37 into closed position against the seat 33. The vacuum created in the aspirating passage 37 is sufficient to move the valve 36 inwardly and permit air to flow from the atmosphere through a small opening 38 in the body 32, around the stem 34 and into the stream of liquid passing at high velocity through the Venturi tube 26.

Figure 3:
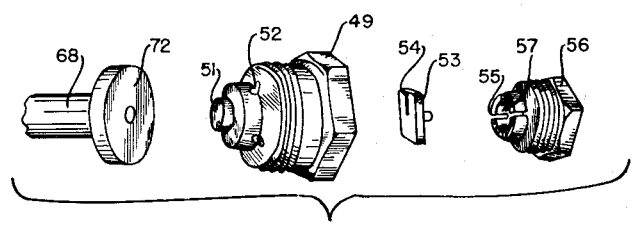
Fig. 3 is an exploded perspective view of a check valve used in my device.
Figure 7:
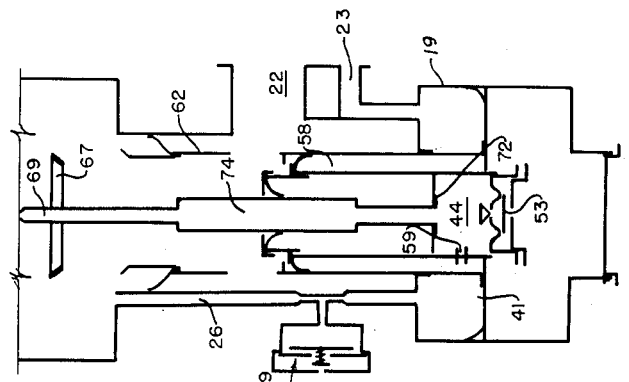
Figure 6:
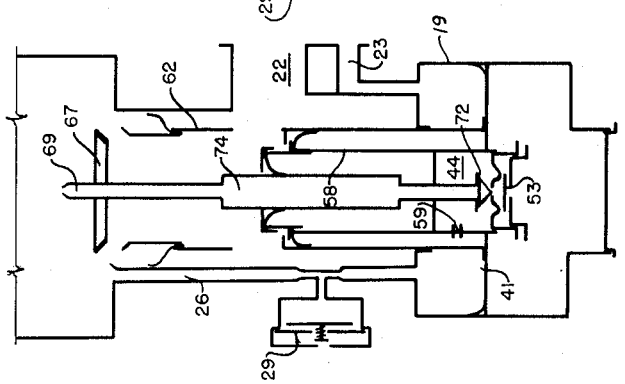
Figure 5:
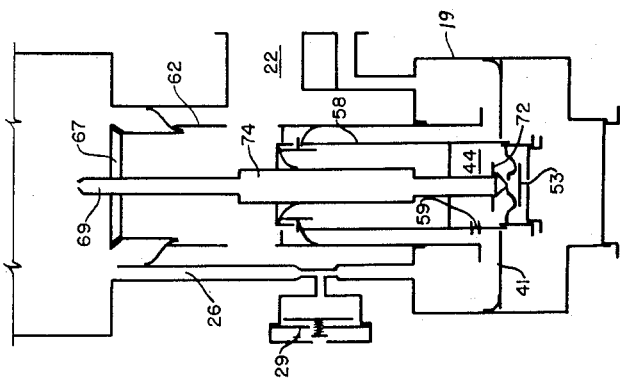

The cylinder 19 is provided with smooth cylindrical internal walls and is counterbored near its upper end to receive a gasket 39 interposed between the cylinder 19 and the body 10. Within the cylinder 19 is a main piston, generally designated 41, having a body 42. The body 42 includes a centrally disposed cylindrical member 43 defining a chamber 44, and a laterally extending cylindrical flange 46, which supports cup leathers 47 in sliding engagement with the inner walls of the cylinder 19. The lower portion of the member 43 is provided with internal threads for receiving a check valve assembly, generally designated 48, best illustrated in Fig. 3.

The check valve assembly 48 includes a body 49 having threaded internal counterbore and an upwardly extending external boss 51. The body 49 is threaded into the member 43 and is provided with a plurality of small radially disposed passageways 52 interconnecting the chamber 44 and the counterbore within the body 49. The lower surface of the counterbore within the body 49 forms a valve seat against which a check valve 53 operates. The check valve 53 is preferably constructed in the form of a flat plate having a groove 54 in its surface, which prevents the plate 53 from completely sealing the passageway over which it extends. The valve 53 is held in position by a nut 56 having an axial bore 57, see Fig. 3, and engaging internal threads formed in the counterbore of the body 49.

To avoid unintentional sealing of the bore 57, the upper face of the nut 56 is slotted, as at 55. When properly positioned, the nut 56 does not force the valve 53 against the valve seat, but permits it to lie in open position on the nut 56 over the slots 55 under the influence of gravity. If, however, the pressure of liquid effective in the bore 57 is greater than the corresponding pressure in the chamber 44, the valve 53 is driven upwardly against its seat and the pressure is allowed to dissipate itself slowly through the groove 54.

The body 43 is also provided with external threads to which I secure an upwardly extending cylindrical member 58 having an aperture 59 formed in a wall thereof. The lower edge of the cylindrical member 58 bears against a washer 61, which in turn forces the cup leather 47 into firm engagement with the flange 46.

A hollow tubular member 62 is provided with external threads for engagement with the threads 13 formed in the body and projects upwardly through the body 10 around the member 58 and within the bore 11. The upper end of the member 62 is provided with internal threads for receiving a cylindrical valve seat 63, the upper end of which projects somewhat above the upper limits of the body 10, and is disposed near the open end 12 in such manner that it lies within the flange 16 of the accumulator 17. A cup leather 64 is secured in position between the valve seat 63 and the member 62, and serves to seal the space between the member 62 and the body 10 against the passage of liquid from the accumulator. A number of openings 66 are formed in the member 62 at the level of the outlet 22, permitting liquid entering the member 62 from the accumulator to reach the outlet.

A main or outlet valve 67 of rubber or the like is employed to seal the member 62 against the passage of water from the accumulator and cooperates with the valve seat 63 for this purpose. The valve 67 is mounted on a stem 68, which is axially disposed with respect to the central bore 11 and the member 62 and extends downwardly into the chamber 44. The stem 68 has an axial bore 69 communicating with the liquid in the accumulator 17 through laterally extending passages 71 disposed above the valve 67 in the stem, and which serve to discharge liquid from the accumulator 17 into the bore 69 and chamber 44. The lower end of the stem 68 is provided with a laterally extending valve head 72, which in closed position engages a mating valve seat formed by inwardly extending lip 73 on the body 43. The lip 73 fits loosely around the stem 68 and permits movement of the stem to a limited degree with respect to the body 43. A stem piston 74 is formed integrally with the valve stem 68 intermediate its ends, the lower end of the piston 74 being disposed within the cylindrical member 58. The upper end of the member 58 is threaded to receive a hollow collar 76, to the upper end of which a packing nut 77 is attached. The space between the member 62 and the cylindrical member 58 is reciprocally sealed by a cup leather 78 clamped in position between the member 58 and the collar 76. Another cup leather 79 is clamped in position between the collar 76 and the packing nut 77 for sealing the space between the stem piston 74 and the collar 76.

Figure 4:
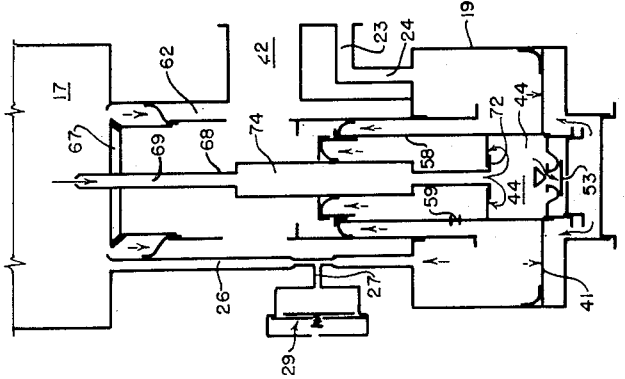

In operation, it may be assumed that the parts are in the position shown in Fig. 4 and that water under pressure from a residence supply system or the like is admitted to the valve through the inlet 23. This water is delivered through the passageway 24 to the upper portion of the cylinder 19, and acts initially in a downward direction against the main piston 41. Since the Venturi passageway 26 is open, the water or other liquid may pass upwardly through the passageway 26 into the accumulator 17. The liquid passing upwardly through the passageway 26 at a high velocity draws air inwardly through the aspirating passageway 27 and the air valve 29, entraining the air with the water and thus replenishing the supply of air in the accumulator 17.

At this stage the piston 41 is forced downwardly by the inlet pressure of the water, this downward pressure being partially neutralized by the upward pressure of the water against the cup leather 78. The downward pressure insures firm engagement between the lip and valve 72 and 73 and thereby supplements the pressure of the water in the reservoir 17 in holding the valve 67 in closed position.

As the pressure in the accumulator 17 gradually rises, the water will flow through bore 69 of the valve stem 68 into the chamber 44. The valve 72 is seated firmly against the lip 73, since at this point in the cycle the main valve 67 is firmly seated and the piston 41 is in its lowest position. The check valve 53, however, permits water to flow through the passageways 52, past the check valve 53, and through the bore 57 in the nut 56 into the cylinder 19, below the main piston 41. As this flow continues, the pressure below the piston gradually rises until it approaches inlet pressure at which time the piston 41 starts to rise slowly, being opposed in this movement by the inlet pressure. This movement is possible because the effective area of the underside of the main piston is greater than the effective area against which the inlet pressure tending to hold the piston down can act, which effective area is the area of the upper side of piston 41 less the area of leather 78. As the piston 41 moves upwardly, the lip 73 is moved away from the valve 72 permitting inlet pressure to pass through the opening 59 downwardly around the valve stem 68 into the chamber 44, and thence through the passage 52 into the portion of the cylinder 19 below the piston 41.

During this portion of the movement, however, the valve 67 remains seated and only a small portion of the water entering the chamber 44 flows upwardly through the bore 69 in the valve stem into the accumulator 17. It will be understood that during this portion of the movement, the cylindrical member 58 moves upwardly with the piston, carrying with it the collar 76 and the packing nut 77, but without affecting the position of the valve stem 68.

Towards the last portion of the upward movement of the main piston 41, the boss 51 on the body 49 of the check valve 48 comes into contact with the lower face of the valve stem 68, effectively sealing the bore 69 against the passage of liquid. This, however, does not prevent the communication of liquid under inlet pressure to the underside of the piston 41 and the upward movement therefore continues a distance sufficient to force the main or outlet valve 67 a short distance from its seat. This action occurs because the effective area which is the area between seals 78 and 79 less the wall area of hollow tubular member 62, exceeds the effective area of the valve 67, and because the pressure in the reservoir 17 acting to hold the valve 67 closed is usually less than inlet water pressure which acts concurrently to force the valve 67 open. This permits the initial flow of water from the reservoir 17 down through the member 62 and thence through the openings 66 into the outlet 22. As the valve 67 opens, the pressure of the liquid in the accumulator 17 acting against the valve 67 is reduced and under these circumstances the inlet pressure of the water acting against the lower surface of the stem piston 74 is sufficient to force the valve stem 68 upwardly, thus moving the valve 67 in the same direction and to a height sufficient to substantially eliminate the action of turbulent forces tending to close the valve 67.

When in this position, the valve 67 is fully open, and the pressure in the accumulator 17 falls rapidly. Since the inlet pressure has forced the valve stem 68 upwardly, the valve 72 is again seated against the underside of the main piston 41. Since the inlet pressure also tends to drive the main piston 41 downwardly, the liquid trapped below the piston 41 will be forced upwardly through the bore 57 in the nut 56 and will force the check valve 53 against its seat in the base of the counterbore in the body 49. Check valve 53 is, however, purposely provided with a groove 54 in order to permit the slow leakage of water past the valve 53 even when in closed position. The water escaping through the groove 54 passes into the chamber 44 and upwardly into the accumulator 17 through the bore 69 where the pressure is now at a point substantially below inlet pressure. As the liquid so escapes, the inlet pressure is effective to force the main piston downwardly, drawing with it the valve stem 68. This of course closes the valve 67 as the piston 41 reaches its lower position, and thus permits the valve to start its cycle over again.

It will be noted that during this cycle of operation the member 62 and the cup leather 64 have not moved. The cup leather 64 does not provide a reciprocal seal, but rather a static seal and is utilized only to permit simple disassembly and servicing of the valve.

From the foregoing it will be seen that the valve 67 is always subjected to conflicting forces tending to open and close the valve, and that these forces vary only between limits which are established by the relative sizes of the various piston members. Since these forces will never vary abruptly, it is obvious that chatter and abrupt seating of the valve 67 are virtually impossible. Ordinarily by proper design the amount of air introduced through the aspirating passageway 27 is simply sufficient to care for the ordinary needs of the accumulator 17, but in the event excess air should be introduced, it may be periodically reduced by conventional control devices. When the inlet water pressure is shut off, it may be also seen that pressure in the Venturi tube 62 will be equal to the pressure in the accumulator. This forces the valve 36 closed and prevents the leakage of water or loss of pressure in the air check valve 29.

From the foregoing it may be seen that several modifications may be made in the structure above described without departing from the spirit and scope of my invention. I do not therefore limit myself specifically to the details herein disclosed, except insofar as defined in the appended claims.

I claim:
1. An automatic hydraulic valve for continuously charging and periodically discharging an accumulator comprising a body having an open end for communication with the accumulator, a central opening extending downwardly from the open end into the body and communicating with an outlet, a cylinder below the opening having a liquid inlet near its upper extremity, a small passageway through the body connecting the upper portion of the cylinder with the open end of the body for discharging liquid from the cylinder into the accumulator, and a laterally extending air aspirating passageway communicating therewith, a main valve for closing the central opening, a valve stem in the central opening mounted for axial movement therein, said valve stem having an axial bore for conducting liquid from above the main valve into the lower portion of the cylinder, a piston in the cylinder having a lost motion linkage with the valve stem for opening and closing the main valve, and an air check valve carried by the body at a level lower than that of the main valve in communication with the small passageway for permitting the aspiration of air into said small passageway, but preventing reverse flow.

2. An automatic hydraulic valve for continuously charging and periodically discharging an accumulator comprising a body, said body having an open end for communication with an accumulator, a central bore, a cylinder formed below the bore, a Venturi passageway in the body extending from the cylinder to the open end, an outlet communicating with the central bore, a liquid inlet communicating with the upper portion of the cylinder, and an aspirating passageway extending laterally inward into communication with said Venturi passageway, a main outlet valve for closing the central bore, a valve stem secured to the valve and extending downwardly through the central bore into the cylinder, a valve on the lower end of the valve stem, a stem piston fixed to the stem intermediate its ends, said stem having an axial bore for conducting liquid from the above outlet valve through the stem, a piston in the cylinder reciprocally engaging the stem and having a valve seat movable by the piston into engagement with the valve on the stem, defining therewith a chamber below the valve seat communicating with the space within the cylinder below the piston, a check valve assembly disposed below the valve stem for restraining the flow of liquid into the chamber from below the piston, said check valve assembly having an upwardly projecting portion adapted to engage and seal the passageway through the valve stem in the course of upward movement of the piston, means below the outlet for reciprocally sealing the stem piston in the central bore, and an air inlet check valve carried by the body and communicating with the aspirating passageway.

3. An automatic hydraulic valve for continuously charging and periodically discharging an accumulator comprising a body, said body having an open end for communication with an accumulator, a central bore, a cylinder formed below the bore, a Venturi passageway in the body extending from the cylinder to the open end, an outlet communicating with the central bore, a liquid inlet communicating with the upper portion of the cylinder, and an aspirating passageway extending laterally inward into communication with said Venturi passageway, a main outlet valve for closing the central bore, a valve stem secured to the valve and extending downwardly through the central bore into the cylinder, a valve on the lower end of the valve stem, a stem piston fixed to the stem intermediate its ends, said stem having an axial bore for conducting liquid from the above outlet valve through the stem, a piston in the cylinder reciprocally engaging the stem and having a valve seat movable by the piston into engagement with the valve on the stem, defining therewith a chamber below the valve seat communicating with the space within the cylinder below the piston, a check valve assembly for restraining the flow of liquid into the chamber from below the piston, said check valve assembly having an upwardly projecting portion adapted to engage and seal the passageway through the valve stem in the course of upward movement of the piston, an apertured hollow member fixed to the piston and extending upwardly therefrom, reciprocal sealing means between the central bore and said apertured hollow member, second sealing means between the hollow member and the stem piston, and an air inlet check valve communicating with the aspirating passageway.

4. An automatic hydraulic valve for continuously filling and periodically discharging an accumulator comprising a body having a cylinder below a liquid inlet and communicating therewith, a small Venturi passage in the body for discharging liquid from the upper portion of the cylinder into the accumulator, and a bore connecting the accumulator with an outlet, a piston reciprocal in the cylinder, a valve for closing the bore, means for opening and closing the valve responsive to movement of the piston, said means including a lost motion linkage interconnecting the piston and valve, a check valve assembly in communication with said accumulator for controlling the flow of liquid from the accumulator to the portion of the cylinder below the piston and restraining flow in the opposite direction, and an air check valve assembly carried by the body and in communication with an aspirating passageway for aspirating air into the stream of liquid flowing through the Venturi passageway.

5. An automatic hydraulic valve for continuously charging and periodically discharging an accumulator comprising a body, said body having a cylinder formed therein communicating near its upper end with an inlet, a central opening in the body disposed for communication with the accumulator, a small passageway through the body for transmitting liquid from the upper portion of the cylinder to the accumulator, an aspirating passageway opening into the small passageway, and an outlet communicating with the central opening, a tube fixed within the central opening and extending downwardly into the cylinder, said tube having apertured walls for discharging water from within the tube to the outlet, means for sealing the space between the tube and the central bore against the passage of liquid from the accumulator, a piston in the cylinder below the inlet, including a centrally disposed chamber, a check valve assembly in the lower end of the chamber in communication with the accumulator for restricting the flow of liquid from the space below the piston into said chamber, an apertured hollow tube fixed to the piston and extending upwardly into said first-mentioned tube, means for reciprocally sealing the space between said tubes, a valve for closing the upper end of said first-mentioned tube, a valve stem secured to said valve and projecting downwardly into said chamber in the piston, a stem piston on the stem intermediate its ends, means for reciprocally sealing the space between the stem piston and the second-mentioned tube, a second valve on the lower end of the stem disposed for sealing engagement with the piston when the latter is in its lower position, said stem being hollow and communicating with the accumulator above the first-mentioned valve, said check valve assembly having a portion projecting upwardly at a distance sufficient to close the opening in said stem and to force said stem upwardly as the piston reaches its upper position, and a valve carried by said body and in communication with said aspirating passageway for permitting the inward passage of air through the aspirating passageway.

WILLIAM S. WHITE.

References Cited in the file of this patent

UNITED STATES PATENTS

| Number | Name | Date |
| --- | --- | --- |
| 2,315,570 | White | Apr. 6, 1943 |
| 2,385,151 | Miller | Sept. 18, 1945 |